US006968453B2

(12) United States Patent
Doyle et al.

(10) Patent No.: US 6,968,453 B2
(45) Date of Patent: *Nov. 22, 2005

(54) SECURE INTEGRATED DEVICE WITH SECURE, DYNAMICALLY-SELECTABLE CAPABILITIES

(75) Inventors: Ronald P. Doyle, Raleigh, NC (US); John R. Hind, Raleigh, NC (US); Marcia L. Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 996 days.

This patent is subject to a terminal disclaimer.

(21) Appl. No.: 09/761,906

(22) Filed: Jan. 17, 2001

(65) Prior Publication Data

US 2003/0159044 A1 Aug. 21, 2003

(51) Int. Cl.[7] .............................................. H04L 9/00

(52) U.S. Cl. ..................................... 713/168; 713/170

(58) Field of Search ............................... 713/200–201, 713/168–170, 181, 189, 192; 380/200, 212, 380/217, 258, 262, 270, 282, 285

(56) References Cited

U.S. PATENT DOCUMENTS

| 5,229,764 | A | * | 7/1993 | Matchett et al. ............ 340/5.52 |
| 6,021,201 | A | * | 2/2000 | Bakhle et al. ............... 713/189 |
| 6,070,245 | A | * | 5/2000 | Murphy et al. .............. 713/201 |
| 6,125,192 | A | * | 9/2000 | Bjorn et al. ................. 382/124 |
| 6,330,670 | B1 | * | 12/2001 | England et al. ................. 713/2 |
| 6,442,690 | B1 | * | 8/2002 | Howard et al. .............. 713/175 |
| 6,704,872 | B1 | * | 3/2004 | Okada ......................... 713/194 |

OTHER PUBLICATIONS http://biz.yahoo.com/bw/00101/sc_inventi.html; "Image Verification Patent Filed on Behalf of PhotoSecurity.Com", press release on Business Wire, Nov. 1, 2000, Charleston, SC, 3 pages.
http://www.techweb.com/wire/story/TWB20000911S0011, "Vendors Race to Put Cameras in Cell Phones", by J. Yoshida, EE Times, Sep. 11, 2000, 5 pages.

* cited by examiner

Primary Examiner—Ayaz Sheikh
Assistant Examiner—Brandon Hoffman
(74) Attorney, Agent, or Firm—Myers Bigel Sibley & Sajovec PA

(57) ABSTRACT

A method, system, computer program product, and method of doing business by providing a secure integrated device (such as a pervasive computing device) for which operating capabilities can be dynamically yet securely selected (including, but not limited to, pluggable connection of input/output devices and/or application processors that provide selected functions). Each input/output (I/O) device and application processor to be used is plugged in to a bus of a security core, and authenticates itself to the security core using public key infrastructure techniques, thereby creating a secure multi-function device. All of the multi-function device's input and output interactions with its environment necessarily traverse an I/O bus under the sole control of the security core. The only communication path between an application processor and the external environment (such as an I/O device) is through an application processor bus, which is likewise under control of the security core. Thus a user may dynamically yet securely select the capabilities of a multi-function device, and because each I/O device and application processor in use by that multi-function device is authenticated, the security of transactions or network services performed when using such devices is improved.

30 Claims, 9 Drawing Sheets

SECURE INTEGRATED DEVICE WITH SECURE, DYNAMICALLY-SELECTABLE CAPABILITIES

RELATED INVENTIONS

The present invention is related to the following commonly-assigned U.S. patents, all of which were filed concurrently herewith: U.S. Ser. No. 09/764,844, entitled "Smart Card with Integrated Biometric Sensor"; U.S. Ser. No. 09/764,827, entitled "Technique for Continuous User Authentication"; U.S. Ser. No. 09/761,899, entitled "Technique for Establishing Provable Chain of Evidence"; U.S. Ser. No. 09/765,127, entitled "Technique for Improved Audio Compression"; and U.S. Ser. No. 09/764,541, entitled "Technique for Digitally Notarizing a Collection of Data Streams".

BACKGROUND OF THE INVENTION

1. Field of the Invention

The present invention relates to a computer system, and deals more particularly with a method, system, computer program product, and method of doing business by providing a secure integrated device (such as a pervasive computing device) for which operating capabilities can be dynamically yet securely selected (including, but not limited to, pluggable connection of input/output devices and/or application processors that provide selected functions).

2. Description of the Related Art

Pervasive devices, sometimes referred to as pervasive computing devices, are becoming increasingly popular, and their functionality (in terms of communication and processing capabilities) is increasing rapidly as well. Pervasive devices are often quite different from the devices an end-user might use in an office setting, such as a desktop computer. Typically, a pervasive device is small, lightweight, and may have a relatively limited amount of storage. Example devices include: pagers; cellular phones, which may optionally be enabled for communicating with the Internet or World Wide Web ("Web"); foreign language translation devices; electronic address book devices; wearable computing devices; devices mounted in a vehicle, such as an on-board navigation system; computing devices adapted to use in the home, such as an intelligent sensor built into a kitchen appliance; mobile computers; personal digital assistants, or "PDAs"; handheld computers such as the PalmPilot™ from 3Com Corporation and the WorkPad® from the International Business Machines Corporations ("IBM"); etc. ("PalmPilot" is a trademark of 3Com Corporation, and "WorkPad" is a registered trademark of IBM.)

Pervasive computing to date has focused on providing unique "point-solution" devices (i.e. single-purpose devices) to address specific and limited functionality needs. The consolidation of multiple categories of functionality into integrated devices has started, but is not very far along yet. This type of functional convergence into an integrated, multi-function package is attractive because it reduces the number of devices a consumer must buy and maintain, and can be expected to reduce the consumer's financial outlay in the process. However, functional convergence poses a dilemma for manufacturers, who have to try to guess which combinations will be attractive to consumers and deliver this integrated function at a competitive price-point. If the manufacturer guesses incorrectly when choosing functionality to combine, it may be left with an unwanted product and millions of dollars in wasted expenditures. Some industry experts believe that consumer preferences will vary even among geographical regions. (See "Vendors Race to Put Cameras in Cell Phones", J. Yoshida, *EE Times* (Sep. 11, 2000), which discusses product requirements for adding digital camera still imaging and video imaging capability to cell phones.) Functional convergence also poses a dilemma for consumers, who have to decide which pervasive devices, with which combinations of functions, to acquire and incorporate into their mobile life-style.

An additional drawback of functionally convergent devices is that, in most cases, security functions have been added to these devices as an afterthought, only after expensive security breaches were detected. For example, strong digital authentication was added to analog cell phones only after hackers were found to have stolen long distance service by cloning phone identities, and digital audio players were made more secure only after the discovery of widespread theft of licensed intellectual property (i.e. music recordings).

Let us review the state of the prior art in the field of pervasive computing, as represented by a mobile professional equipped with a collection of the latest generation of specialized personal devices. She may have a cellular telephone, a two-way pager, a "smart" credit card (also known as a "smart card"), a "smart" employee badge used to access secure areas, a PDA, a digital still camera, a digital video camera, a dictation recorder with voice recognition capability, an MP3 music player, a remote control key-chain for access to an automobile, a second remote control key-chain for access to a garage, a global positioning system (GPS) navigation aid and map pad, a weather-alert radio, and a personal health alert fob to summon medical aid—all of which may be capable of interacting wirelessly with one another, perhaps via short-range radio technology such as Bluetooth. ("Bluetooth" is a standardized technology that enables devices containing a low-powered radio module to be automatically detected upon coming into radio proximity with one or more other similarly-equipped devices. Devices incorporating this technique are referred to as "Bluetooth-enabled" devices. A standard defining the Bluetooth techniques may be found on the Web at http://www.bluetooth-.com.)

One problem is that this array of devices is simply too large! It is unlikely that a person will carry all of these on every outing or trip. Even if she did, will she remember to charge each device's batteries?

A second shortcoming is that prior-art devices are designed to operate independently—i.e. not to rely on other devices for operation. This implies significant functional duplication across devices.

There has recently been a focus on interconnecting the initial generation of point-solution pervasive devices such as those in the example into loosely-coupled personal networks via wireless (e.g. radio or infrared) technology. However, this type of interconnection creates additional security exposures. For example, a hacker may eavesdrop on the wireless transmissions between devices and maliciously use data that has been intercepted. Even though such ad-hoc collections of networked personal devices offer the potential for exploiting the devices in new ways and creating new methods of doing business, these new avenues cannot be fully exploited until security issues are addressed.

A collection of prior-art devices is generally unsecure unless each device contains a secure component capable of recognizing the authenticity of its neighbors, of the user, and of the application software it contains. This means that a loosely coupled "secure" solution built from prior art devices has numerous costly duplicate security components, both hardware (for example, protected key storage, buttons or other human-usable input means, display means, and so forth) and software. Additionally, a loosely coupled collection of prior-art devices has poor usability because of the need for multiple sign-ons to establish user identity, and the need to administer lists defining trust relationships among devices that may potentially communicate. The result in the real world is an unsecure solution. This is because only rudimentary security is implemented in an individual device, due to cost, and every communication pathway (especially wireless ones) between devices is subject to attack. These problems rule out the practical implementation of many useful functions and high-level business methods using collections of prior-art devices.

Consider, for example, a method of doing business wherein a consumer orders merchandise on the Web using a communicating collection of three specialized prior art devices. The devices are: (1) a smart credit card, (2) a PDA with a Web browser, and (3) a cellular telephone which acts as a modem for connecting the browser to a Web server application. Assume for purposes of discussion that the three devices communicate locally using wireless technology such as Bluetooth radio.

Once the user has finished selecting merchandise, he needs to sign the order with his credit card's credentials. To do this, the smart credit card first needs to verify the user's identity. Prior art smart cards have neither a display to query the user for identity information, nor a button or other indicator with which the user can indicate his approval of a trust relationship. Typically, the user would prove his identity to the smart card by keying in a secret input (such as a personal identification number, or "PIN") on a keyboard of the PDA, where the smart card has previously been mechanically coupled to a smart-card reader which is also operably attached to the PDA. The user's input is then transmitted via the mechanical link to the smart card for verification.

The first problem in this scenario is that application code is executing in the same device to which the input sensor is connected. Today there is little to prevent a hacker from installing a Trojan horse-style virus (or other malicious application code) in a PDA. Such a virus could eavesdrop on the user's secret information, intercept this information, and then report it back to a server application; it could record a transaction signed by the user's smart card for later playback without the user's authorization; or it could trick a user into signing a transaction that contains modified data. (Recently the first virus infestations of cell phones were reported, and it can be expected that such attacks will surface more frequently with personal computing and personal communication devices as increasingly valuable amounts of e-business are transacted wirelessly.) While a challenge/response sequence in the Web shopping application could avoid the playback problem, it means an extremely inconvenient human interface (which may comprise a game of 20 questions, e.g., "What is your mother's maiden name, your home phone number, your zip code, your birth date, the last four digits of your social security number, your place of birth, your pet's name?", etc.). Not only is this inconvenient, but it provides another opportunity for security to be compromised: once a user divulges her personal answers to these questions to one Web merchant, the answers could be used by an unscrupulous person to gain unauthorized access to some other Web site that uses the same questions for authorization.

Suppose that the user's identity has been successfully verified. After this occurs, the order must be signed. This comprises transmitting the unsigned order to the smart credit card, which signs it using the user's private key and returns it, digitally signed and legally binding upon the user, to the PDA's browser for transmission to a merchant. But another security exposure arises in the signing process, in that it is not possible using these prior art techniques to know that what was displayed to the user equalled what was sent to the card for signature. For example, the display presented to the user may perhaps show an order for a dozen grapefruit, while in fact a server may have been hacked to install a trojan JavaScript to execute on the PDA that would trick the user into signing an order for a dozen diamond rings by modifying the transaction before sending it to the smart card for signature. Digitally signed transactions are intended to be legally binding and not subject to repudiation by the user, and thus it is imperative that appropriate security measures are in place to ensure that the user's digitally signed data represents the transaction to which the user actually assented.

U.S. Pat. No. 6,772,331, entitled "Method and Apparatus for Exclusively Pairing Wireless Devices", (Ser. No. 09/316, 686, filed May 21, 1999) taught a technique for establishing secure trusted relationships between devices in a Bluetooth network using special-purpose hardware, along with software on each device. The special-purpose hardware comprises, for example, a protected memory for storing a digital signature, where this memory is physically attached to the radio transmitter of each device; a display screen on at least one device capable of showing a media access control (MAC) address of the device; and an input button or other comparable device on at least one device for the user to indicate his assent to a trust relationship. While the disclosed technique provides security improvements for networking a collection of devices, there is a significant cost involved. Even if such an investment were made, the overall business process would remain unsecure against certain types of attacks. Furthermore, the disclosed technique cannot be applied to prior art smart credit cards, which have neither a display nor a button for indicating trust.

Accordingly, what is needed is a technique whereby multiple functions can be conveniently and economically provided in a single personal device, while still ensuring the security of the device and the operations it performs.

SUMMARY OF THE INVENTION

An object of the present invention is to provide a technique whereby multiple functions can be conveniently and economically provided in a single personal device, while still ensuring the security of the device and the operations it performs.

Another object of the present invention is to provide this technique by providing for secure pluggable application processors.

Yet another object of the present invention is to provide this technique by providing for secure pluggable input and output processors.

Still another object of the present invention is to provide this technique by authenticating each plugged-in component before trusting that component.

Another object of the present invention is to provide a technique for improving security of transactions carried out with personal devices.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for providing a secure, integrated device with dynamically selectable capabilities. In one embodiment, this technique comprises operating a security core which provides security functions and securely operably connecting one or more components to the security core, such that the security core can vouch for authenticity of each securely operably connected component, wherein the security core and the operably connected components thereby comprise the secure integrated device. Selected ones of the operable connections may be made using one or more buses of the secure integrated device, or by using a wireless connection between respective ones of the components and the security core. In the latter case, the wireless connections preferably use Secure Sockets Layer data encryption (or an equivalent which provides mutual authentication of both endpoints, negotiation of a time-limited key agreement with secure passage of a selected encryption key, and periodic renegotiation of the time-limited key agreement with a new encryption key). Furthermore, selected ones of the secure operable connections may be provided when the security core is manufactured.

The components may comprise one or more of (1) input/output components and (2) application processing components. Securely operably connecting a component preferably further comprises authenticating the operably connected component to the security core. This authentication preferably provides a unique identifier of the operably connected component to the security core.

Securely operably connecting a component preferably occurs upon a hardware reset of the component, wherein this hardware reset is activated by operably connecting of the component. The authentication discussed above is preferably activated during execution of instructions stored on the component, wherein this execution of stored instructions is preferably activated by the hardware reset of the component. In this case, the instructions for performing the authentication are preferably securely stored on the component.

In addition, the security core may authenticate itself to the operably connected component. Optionally, a user of the secure integrated device may be authenticated. The authentication(s) preferably use public key cryptography.

The secure integrated device may be a pervasive computing device.

One or more cryptographic keys are preferably securely stored in each of the components, wherein at least one of the securely stored keys is used when securely operably connecting each component. Furthermore, one or more cryptographic keys are preferably securely stored in the secure integrated device.

The secure integrated device may be used for securely performing a transaction. In this case, the technique preferably further comprises detecting whether components remain operably connected to the secure integrated device during the securely performed transaction, and aborting the securely performed transaction if components fails to remain operably connected to the secure integrated device during the securely performed transaction. (Or, the securely performed transaction may be marked as not secure if components fails to remain operably connected to the secure integrated device during the securely performed transaction.) While securely performing the transaction, the security core may optionally digitally notarize an output data stream created by a selected one of the operably connected components of the secure integrated device. In this case, the digital notarization process preferably further comprises: authenticating the selected operably connected component to the security core; computing, by the security core, a hash value over the output data stream; hashing, by the security core, a combination of (1) the hash value and (2) the unique identifier of the selected operably connected component, thereby creating a hashed data block; digitally signing, by the security core, the hashed data block using a private key of the security core; and providing the digitally signed hashed data block along with the combination as the digital notarization of the output data stream. (This private key of the security core is preferably securely stored in the secure integrated device.) Or, this digital notarization process may operate upon segments of the output data stream (where a boundary between segments may be determined by an elapsed time value). In either of these cases, authenticating the selected operably connected component preferably further comprises using a unique identifier of this component, where the unique identifier is digitally signed by the component using a first private key associated with the component. When using segments, authenticity of selected ones of the digitally notarized segments of the output data stream may be separately verified using a public key of the security core. The digital notarization may further comprise authenticating a user of the secure integrated device, and including an identification of the authenticated user in the combination.

When an output data stream (or its segments) is digitally notarized, the verification of authenticity by a receiver thereof, and of the digitally signed hashed data blocks therefor, preferably uses a public key of the security core, and the receiver may conclude that the output data stream (or its segments, as appropriate) is authentic if the verification succeeds. (This public key may in some cases be obtained from a digital certificate of the security core.) The receiver may also conclude that the output data stream has not been tampered with if the verification succeeds.

In this technique, an optional aspect comprises dynamically revising functionality in a selected one of the securely operably connected components of the secure integrated device by securely applying a firmware update to the selected one, and requiring the selected one to re-authenticate itself to the security core, such that the security core can continue to vouch for the authenticity of the selected one. (Or, in some cases, the security core may continue to vouch for the selected one without a re-authentication.) Capabilities of the secure integrated device may be dynamically revised by subsequent operation of the securely operably connecting process, this subsequent operation being activated upon operably connecting a new component to the security core, wherein the new component authenticates itself to the security core, with a result of the authentication being that the capabilities of the secure integrated device are thereby augmented with capabilities of the new component.

In some aspects of this embodiment, the security core may optionally be located on a selected one of the operably connected components, in which case the security core and the selected one are connected to a common bus. Or, in some aspects, a second security core may optionally be located on a selected one of the operably connected components, in which case the security core and the second security core each provide security functions for one or more components of the secure integrated device.

In another aspect, the present invention provides a technique for improving security of transactions in portable devices, this technique comprising: providing security function in a security core of a portable device; operably connecting one or more components to the security core, wherein each component provides input/output capabilities or application processing capabilities; and verifying authenticity of each operably connected component, such that the security core can vouch for transactions created by the operably connected components while the operably connected components remain operably connected. Verifying the authenticity preferably further comprises performing a security handshake between the security core and the operably connected component upon occurrence of the operably connecting. The security handshake may be performed using Secure Sockets Layer encryption (or an equivalent thereto) to encrypt data. Each operably connected component preferably has associated therewith a digital certificate, a private cryptographic key and a cryptographically-associated public key, and a unique device identifier that is used to identify data originating from the operably connected component.

The present invention may also be used advantageously in methods of doing business, for example in Web shopping applications or in other applications in which the operations or transactions to be performed are security-sensitive.

The present invention will now be described with reference to the following drawings, in which like reference numbers denote the same element throughout.

DESCRIPTION OF THE PREFERRED EMBODIMENTS

Figure 1:
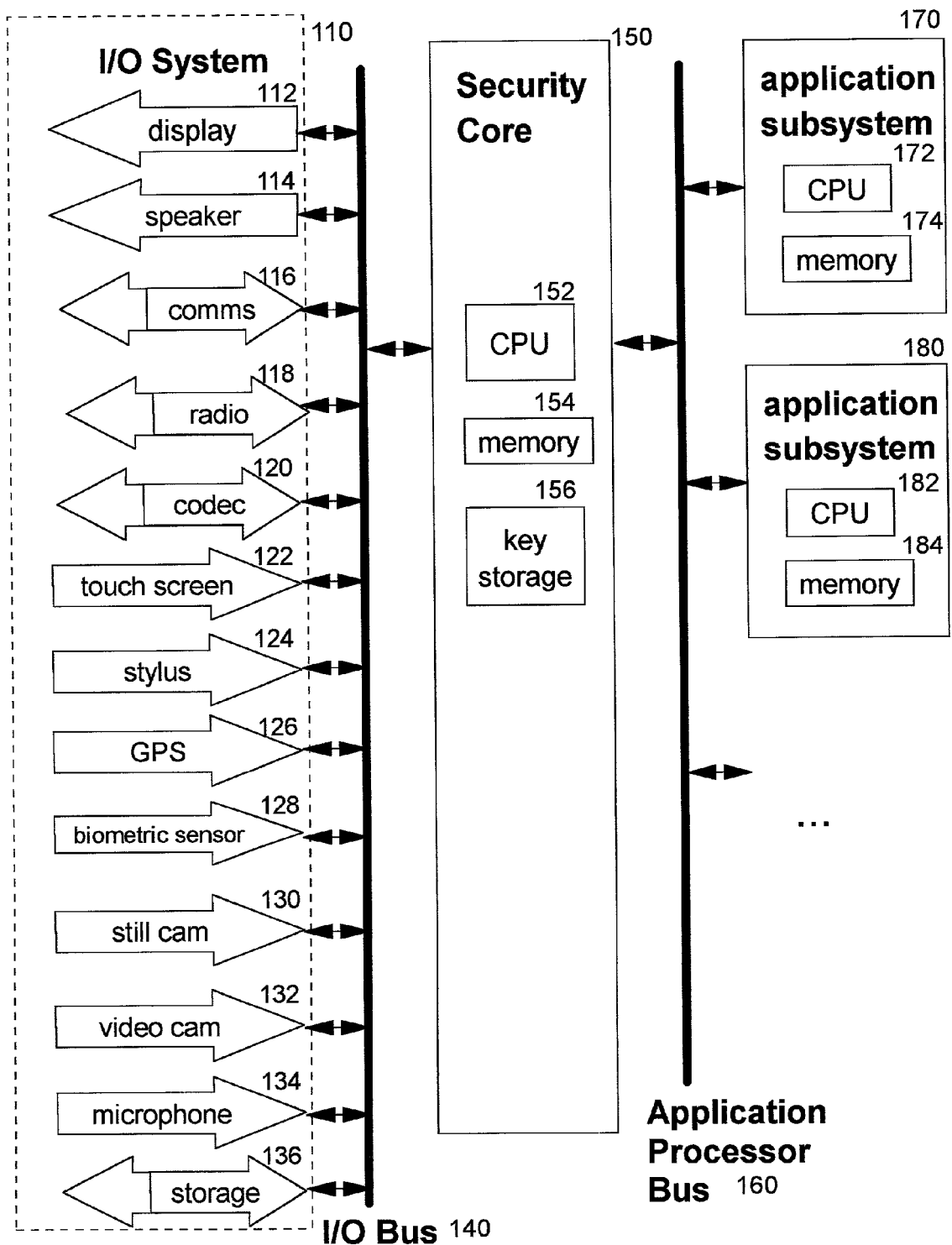
FIG. 1 is a block diagram of a secure integrated device, according to preferred embodiments of the present invention.

The present invention improves the security of wireless pervasive devices. Central to the invention is a comprehensive, top-down design that focuses first and foremost on security through a security core, as shown at element 150 in FIG. 1. To this secure core, hardware and/or software support for one or more types of personal application functionality can be selectively and dynamically added, resulting in a secure multi-function pervasive device.

The preferred embodiments of the present invention use a multi-processor architecture in which the master processor is a security core 150 which comprises a central processing unit (CPU) 152, a memory 154, and a protected area 156 for storing cryptographic keys. Preferably, a technique such as that defined in commonly-assigned U.S. Ser. No. 09/614,982 or U.S. Ser. No. 09/614,983, which are entitled "Methods, Systems and Computer Program Products for Secure Firmware Updates" and "Methods, Systems and Computer Program Products for Rule Based Firmware Updates Utilizing Certificate Extensions", respectively, is used for tightly controlling the code that executes in the security core. (These patents are referred to herein as the "referenced patents", and the teachings of these patents are hereby incorporated herein by reference.) These patents teach techniques whereby a latch may be used to enable access to firmware instructions, for example to update the firmware. In preferred embodiments, the latch is set to allow access upon a hardware reset operation, and is set to prevent access upon completion of an update operation. By limiting the period of time in which access to the firmware is allowed to the portion of the boot sequence whose instructions execute out of a non-writable memory, it is much less likely that the firmware can be tampered with, as contrasted to the prior art. These patents also teach use of digital certificates to authenticate the source of a firmware update, thereby greatly increasing the likelihood that any applied updates are from a legitimate source, and use of digital signatures to ensure the integrity of the contents of the update.

The protected storage 156 in which the cryptographic key(s) used by the present invention is/are securely stored may be a write-only memory, such that previously-stored data values in this memory cannot be read by software resident on the security core but the security core can execute operations on the stored values using instructions implemented in the security core's hardware or firmware. (In particular, the preferred embodiments of the present invention may compute digital signatures using the security core's previously-stored private cryptographic key using this approach.) Alternatively, the protected storage 156 may be a read-write memory, where read access is available only by means of a secret key which is shared by the security core and a memory controller that protects access to the storage. Or, protected storage 156 may comprise read-only memory (ROM), or perhaps erasable programmable read-only memory EPROM) or electrically erasable programmable read-only memory (EE-PROM), or other types of memory that can be controlled using the techniques of the referenced inventions.

The security core of the preferred embodiments has two buses. An input/output (I/O) bus 140 is employed to connect and enable communication between the devices of I/O system 110 and security core 150, and an application processor bus 160 connects (and enables communication between) the security core and the application processors 170, 180. Application-specific functionality is preferably added to the security core by plugging in one or more application processing components or subsystems 170, 180 to the applicator processor bus 160.

The buses 140, 160 are depicted as hardware buses, but they could also be implemented as wireless links, coupling the various I/O and application processor components with the security core wirelessly. When the buses are wireless links, the security handshake described below should include Secure Sockets Layer (SSL)-like encryption in addition to authentication, in order to provide mutual authentication of both endpoints, negotiation of a time-limited key agreement with secure passage of a selected encryption key, and periodic renegotiation of the key agreement with a new encryption key. (Alternatives to use of SSL include Bluetooth link layer encryption, IPSec —which is also known as "ISAKMP-Oakley"—and perhaps others).

One or more I/O devices or components may also be selectively and dynamically plugged in to the I/O bus 140 to form an I/O system 110. Example I/O components include a display means 112, audio speaker 114, communication means 116 (such as a modem), radio 118, code/decode module ("codec") 120, touch screen 122, stylus 124, GPS component 126, biometric sensor 128, still camera 130, video camera 132, microphone 134, and persistent storage 136.

In the preferred embodiments, a consumer purchases the security core, which provides general security functionality (as will be described in more detail), and then selects application processing components and I/O components according to the user's particular computing or processing interests. (References herein to "computing" devices are intended to include devices which are capable of performing processing or computations, and/or communications functions, without regard to how a particular user of such a device actually uses it.) Each application subsystem contains stored instructions in its memory 174, 184 wherein these instructions operate to provide the subsystem's particular functionality. (Note that the application processing subsystems are shown in FIG. 1 as also having their own CPUs 172, 182. In alternative embodiments, the application subsystems may rely on the CPU 152 of the security core 150.) Once an application processing component or I/O component is plugged in to the security core and authenticated using the techniques of the present invention, the result is a securely integrated multi-function device which is now selectively and dynamically augmented by the functionality of that component. In this manner, consumers obtain multi-function devices that are tailored to their own interests while pervasive computing device manufacturers avoid the problem of trying to guess which combinations of pre-packaged functionality will be appealing to consumers. For example, a consumer might initially purchase an add-on subsystem or module for audio recording. Later, if the consumer decides she needs a digital still camera, she can add a camera module for recording images.

According to the present invention, all of the multi-function device's input and output interactions with its environment necessarily traverse the I/O bus 140 under the sole control of the security core. For example, before security core 150 accepts input from the touch screen 122 component, this touch screen component must authenticate itself to the security core. Similarly, each application processing component must authenticate itself to the security core. Preferably, public key infrastructure (PKI) techniques are used in the authentication operations of the present invention. (It is assumed for purposes of the preferred embodiments that a mutual authentication process is used, whereby the security core also authenticates itself to the attached components. However, this authentication of the security core may be omitted in an appropriate case without deviating from the concepts or scope of the present invention.) The only communication path between an application processor and the external environment (such as an I/O device) is through the application processor bus 160, which is likewise under control of the security core. The I/O components and application processors therefore operate as slaves to the master security core.

Various I/O components, and/or various application processors, may be permanently connected to the I/O bus and application processor bus during the manufacturing process for the security core. Additional I/O and application processing components may then be dynamically added by the consumer as needed. Or, a security core may be manufactured with no preselected components, in which case the consumer selects the complete set of components which make up her multi-function device.

The multi-function personal device provided by the present invention can perform a function securely for a fraction of the cost of performing the same function using an ad-hoc collection of loosely coupled prior art point-solution devices. This will be true even when only a subset of the multi-function device's functionality is used.

The present invention reduces the cost and complexity of computing and communicating using pervasive computing devices, as contrasted to the prior art, by integrating one or more specialized application processors around a common security core that controls all I/O to and from the application processor(s), and by preferably sharing common elements among the application processor(s). The shared elements may include (but are not limited to) batteries, docking ports, I/O connectors, a display screen or other display means, a microphone, speakers, a touch-sensitive input device, biometric sensors, radio transmitters, an antenna, the physical packaging, persistent storage, and a battery charger. The result provides greater security than the prior art while reducing weight, footprint, power consumption, implementation complexity, and cost.

In the preferred embodiments, components that authenticate themselves to the security core must remain physically attached thereto throughout an application function. Application-specific processing may be provided within each application processing subsystem to handle detachment of a component. For example, if camera module 130 is unplugged from the security core in the middle of taking a photo, the camera would have no way to transmit the photo (since it is preferably dependent on the security core for power, I/O, image storing, and so forth). If this module 130 is subsequently plugged in to a second (different) security core, that second security core would preferably stamp any pre-existing data in the camera as "unsecure" as the data traverses the second core (for example, on its way to the I/O bus of the second integrated device for purposes of storing captured images in persistent storage). (Alternatively, the second device may be adapted such that it will not accept any previously-created data.) Marking a data stream "unsecure" indicates the security core's inability to vouch for the authenticity and untampered state of I/O or application processor data.

The present invention avoids the pitfalls of the prior art, which were illustrated above with reference to a Web shopping example, by placing the security component between the environment and the previously unsafe application functions (e.g. web browser). In the approach of the present invention, data entered by the user on a secure, authenticated keyboard or other similar device is securely transmitted through the security core to a secure, authenticated order processing application, and the authenticated order processing application also securely transmits data through the security core for display to the user. Thus, there is no chance of a hacker or malicious code intercepting the user's secret identification sequence. (The example discussed the user's secret identifying information as a PIN. As will be obvious, many other types of identifying information may be used alternatively, such as a fingerprint or retinal scan, a voice print, and so forth.) Furthermore, the present invention verifiably ties a digital signature to what the user sees or hears (e.g. an order for grapefruit rather than for diamond rings), because the security function in the security core is tamper-proof and controls all I/O to and from the application processor, thus safely isolating any dangerous application code where it can do no harm.

The functionality of application processors used with the security core is preferably embodied in firmware in a ROM, which may be non-programmable or (preferably) field-programmable. If the ROM is programmable, the only way new application code can be installed therein is by traversing the security core. Preferably, the teachings of the referenced inventions are used for any updates to the application processors, whereby the new application code is securely loaded in a manner that prevents the introduction of malicious code and viruses.

Furthermore, the referenced inventions describe selective enablement of functionality that is pre-stored in a device. For example, as discussed therein, a manufacturer might choose to ship a single code base that is capable of providing multiple levels of device functionality, and based on what the consumer pays for, a particular level of this pre-stored functionality will be made available by modifying the firmware on the consumer's device. This selective enablement approach may also be used advantageously with the components of the present invention whereby an attached component may initially be configured for (and authenticated for) providing one set of functionality, and then this initial functionality may subsequently be revised or upgraded (using the teachings of the related inventions) to allow access to other functionality. According to the present invention, the revised or upgraded functionality may either be presumed authentic by the already-established authentication of the component in which it resides, provided that component remains attached to the security core. (Alternatively, an implementation of the present invention may be configured such that this type of firmware revision requires an additional authentication process for the attached component.)

Figure 2:
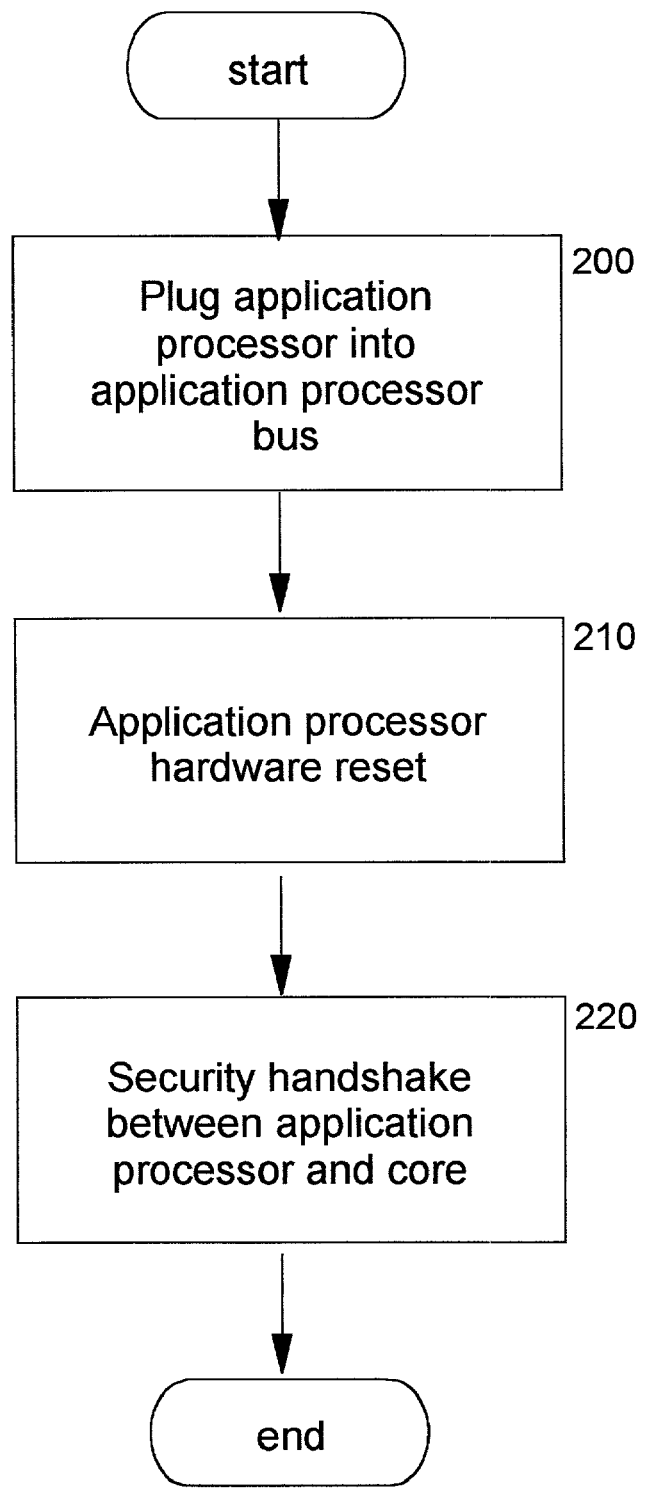
FIG. 2 illustrates a flow chart depicting logic with which preferred embodiments of the present invention may authenticate a dynamically-selected and dynamically-attached application processing component.

FIG. 2 depicts logic that may be used to implement preferred embodiments of the component authentication process of the present invention. This logic is executed when an application processor is plugged in to the application bus (Block 200). The act of plugging in the processor causes a hardware reset (Block 210) of the application processor (at the electrical level). This hardware reset is preferably initiated as in the prior art, and clears the application processor's memory, sets all hardware components (such as I/O ports, interrupt controllers, timers, and direct memory access controllers) to a known initial state, and causes the application processor's CPU to start executing a predetermined instruction stream at a particular memory location. (This particular memory location is preferably an address within the application processors ROM, or other on-board memory or storage.) The hardware reset is necessary so that the application processor will be in a known state, so that the security core can vouch for its state thereafter (for the interval over which the application processor remains continuously plugged in to the application bus). Among the initial instructions executed, according to the present invention, will be those required to perform a security handshake (Block 220) between the security core and the application processor. This security handshake is preferably an SSL-like handshake, and its purpose is mutual authentication between the two connecting devices. In preferred embodiments of the present invention, the security handshake is performed using the teachings of commonly-assigned U.S. Pat. No. 6,826,690 (Ser. No. 09/435,417), which is entitled "Using Device Certificates for Automated Authentication of Communicating Devices" and which is hereby incorporated herein by reference. According to these teachings, each device must be provided with a digital certificate and a private cryptographic key, as well as a unique device identifier (such as a MAC address or perhaps a serial number). For purposes of the present invention, the device identifier may be used later to uniquely and verifiably identify data streams coming from this application processor.

In preferred embodiments of the present invention, encryption and digital signatures are performed using asymmetric key cryptography. Asymmetric (or public) key cryptography uses two different keys that are not feasibly derivable from one another for encryption and decryption. A person wishing to receive secure data generates a pair of corresponding encryption and decryption keys. The encryption key is made public, while the corresponding decryption key is kept secret. Anyone wishing to provide encrypted data to the receiver may encrypt the data using the receiver's public key. Only the receiver may decrypt the message, since only the receiver has the private key. (Note that, for purposes of efficiency, use of asymmetric cryptography is preferably combined with symmetric, or shared key, cryptography. Symmetric key cryptography is preferably used for bulk data encryption operations, in accordance with well-known practices.)

Asymmetric-key cryptography may also be used to provide for digital signatures, in which a first party encrypts a signature message using that first party's private key, where this signature message is a hash or digest of the data being signed. Because the signature message can only be decrypted with the signing party's public key, a second party can use the first party's public key to confirm that the signature message did in fact originate with this first party. Asymmetric-key cryptography systems, and the techniques with which they may be used for ensuring the privacy, authenticity, and integrity of data, are well known in the art and will not be described in detail herein.

If the authentication process of Block 220 completes successfully, then the security core may trust the application processor (and, inter alia, allow it to perform functions and exchange information with the I/O subsystem).

A process similar to that shown in FIG. 2 occurs when a peripheral I/O device is plugged in to the I/O bus. The peripheral device's hardware is reset to a known initial state, and the security core learns the device's unique device identifier during the mutual authentication process. This device identifier may later be used by the security core to uniquely identify the data stream emitted by that peripheral device.

As has been stated, a security core may be manufactured with one or more components permanently attached thereto, such that those components are covered by the same protective packaging as the core itself. When this is the case, then the hardware reset and authentication operations of FIG. 2 are not required for such components. Instead, the device identifier that is used by preferred embodiments for identifying the components and data streams they create is preferably obtained by reading a previously-stored (unique) identifier from the permanently-attached component when needed (e.g. by issuing I/O operations against a well-known I/O port).

The present invention also allows the security component to relate multiple data streams and notarize this relationship. That is, digital notarization allows the security core to effectively "seal" the contents of a collection of related data streams. In this manner, the security of transactions performed while using an integrated personal device, as well as the secure delivery of other network services, is facilitated. A wide range of environmental inputs is possible in an integrated pervasive device created according to the present invention. Such environmental inputs include video, audio, geographic location (both GPS and cell phone triangulation), time, direction, keyboard input, handwriting, thumbprint, barometric pressure, temperature, etc. This environmental input information can optionally be further enhanced by isolating various hardware codecs behind the device I/O "firewall" provided by the present invention, allowing real time compression/decompression/encryption/decryption of the streams as well as allowing digital notarization information to be added for the streams. The notarization process is illustrated in FIG. 3.

Figure 3:
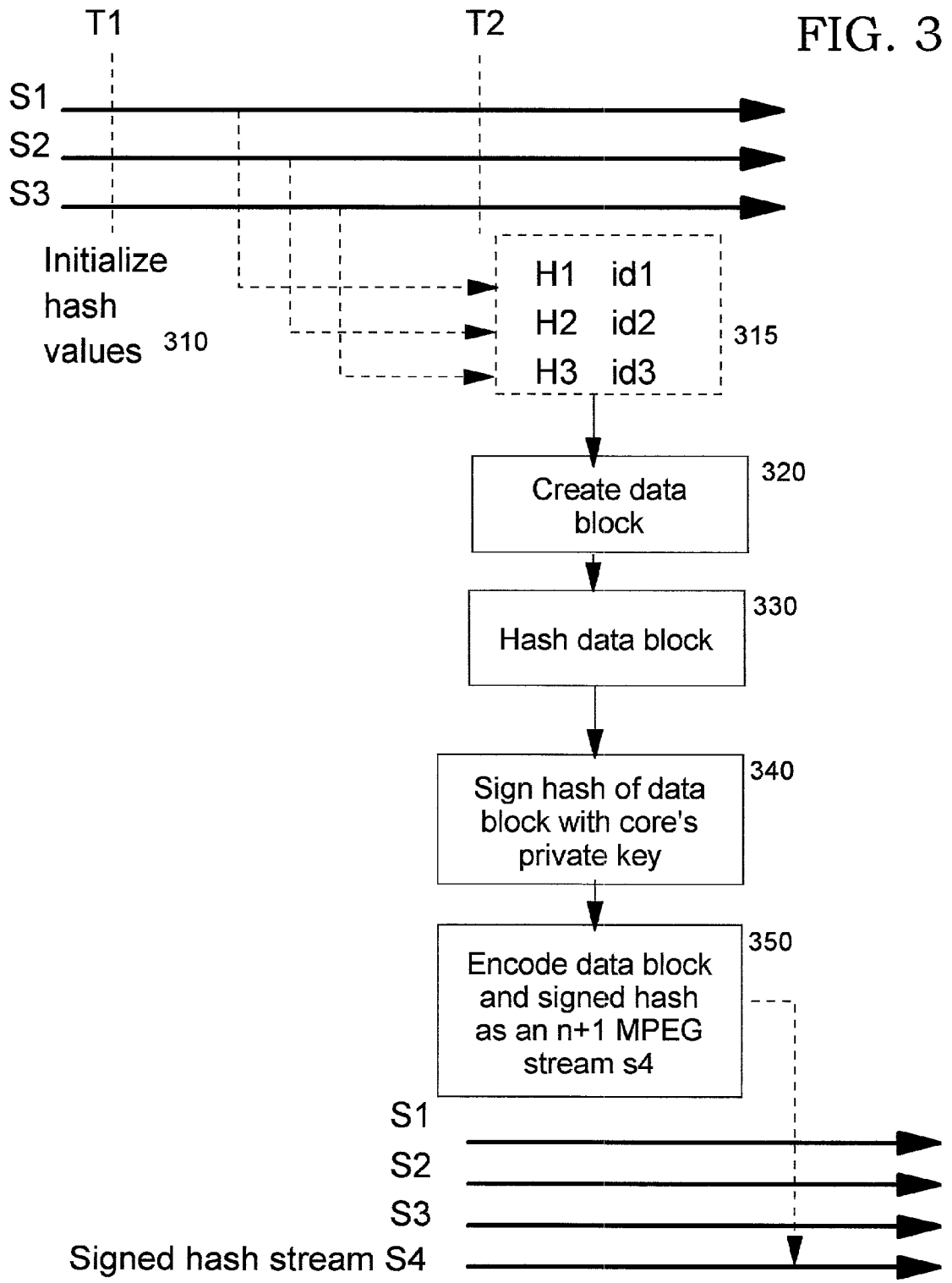
FIG. 3 illustrates a flow chart depicting logic with which preferred embodiments of the present invention may notarize a collection of data streams.

Referring now to FIG. 3, a process is depicted whereby the security core may "notarize" a collection of multiple data streams involving one or more application processors and/or one or more peripheral I/O devices. Using this process, the security core creates a digital notarization of the data in the collection of data streams. In the preferred embodiments, this notarization is performed at periodic intervals. For purposes of illustration, assume that a collection of three data streams is being notarized. As shown in FIG. 3, S1, S2, and S3 designate these three data streams, which originate from devices having unique device identifiers referred to herein as "id1", "id2", and "id3", respectively. T1 and T2 represent two distinct points in stream relative time (i.e. points of synchronization between the streams, which may be used, for example, to relate video frames in one stream to audio playback in another stream). Periodically (e.g. beginning at time T1), the security core will initialize a set of hash values (see element 310), one hash value per data stream that it wishes to notarize. Preferably, a secure hash algorithm such as that known as "SHA" is used. (Refer to "Applied Cryptography", Bruce E. Schneier, p. 442, for a description of SHA.) Alternatively, other hash algorithms may be substituted without deviating from the spirit and scope of the present invention. Hash values H1, H2, and H3 are computed over the data in each stream S1, S2, S3. At time T2, these hash values H1, H2, H3 therefore contain the respective hash values for streams S1, S2, and S3 during the time interval from T1 to T2. As shown at Block 320, the security core creates a data block (shown as element 315) containing the hash values H1, H2, and H3 as well as the device identifiers id1, id2, id3 of the respective devices which emitted the data streams S1, S2, S3. The hash values (or a new copy thereof) are also reset at time T2 (not shown in FIG. 3) in order to begin computing a new hash for each stream over the period of the next interval which begins at time T2.

The security core now preferably computes a hash of this data block (Block 330). The security core then signs this hashed data block (Block 340) using the security core's private key. (The security core's private key is preferably securely stored in protected key storage, as shown at element 156 of FIG. 1 and as previously discussed.) Another data structure is then preferably created by the security core, where this data structure contains the original data block from Block 320 (shown as element 315) as well as the signed hash thereof which was computed in Blocks 330 and 340. This new data structure is then encoded (Block 350) as another data stream, referred to in this example as "S4", and this additional data stream is added to the collection as a notarization. In the preferred embodiments, the data streams S1 through S3 are SL-Packetized Streams within an MPEG-4 FlexMux stream, the timestamps T1 and T2 are encoded at the appropriate positions within the data streams S1 through S3 using MPEG-4 synchronization timestamp methodology, and the signed hash stream S4 is an "n+1" MPEG SL-Packetized Stream that is also timestamped so that it can be correlated with streams S1 through S3. The notarized collection of data streams S1 through S4 may then be sent to a receiver, preferably as a FlexMux Stream over a TransMux Channel. (Alternatively, the notarized collection may simply be stored for future use.) An overview of the MPEG-4 standard, provided by the international standards working group responsible for its definition, can be found on the Internet at http://www.cselt.it/mpeg/standards/mpeg-4/mpeg-4.htm.

Periodically (or at least once during the start of communications), the security core's digital certificate must also be made available to the receiver of the notarized data stream collection, so that the receiver can obtain the security core's public key which can be used to verify that the core's private key was used to sign the notary information in the "n+1" stream. The security core's certificate may be sent to the receiver by the security core, or it may be retrieved (e.g. from a certificate repository) by the receiver.

A receiver wishing to determine if any one or all of the encoded data streams S1 through S3 is authentic and not tampered with can check the digital notarization encoded in stream S4. The receiver uses the signer's public key, which is preferably obtained from the security core's certificate, to decode or decrypt signed blocks in stream S4. The receiver uses the same hash function that was used by the security core, and computes a new hash over the decrypted stream hash values (H1, H2, and H3 in the example) and device identifiers (id1, id2, and id3). This newly-computed hash is compared to the hashed value from the decrypted data block. If the values match, then the collection of data streams is authentic. Furthermore, a match indicates that the streams have not been altered.

As an alternative to obtaining the public key from a digital certificate, the receiver may perhaps have a securely-stored local copy of the public key (e.g. where this public key is for a device with which this receiver is adapted to communicating). In this case, the public key is preferably stored in secure storage at the receiver. Note that the receiver may be another secure integrated device created according to the present invention, or it may simply be any prior art device which is capable of performing the authentication of the notarized data streams. When the receiver is a secure integrated device, then the public key of the notarizing party is preferably stored in key storage 156.

In addition to, or instead of, computing a hash over the entire data block in Blocks 320 and 330, separate hashes may be computed and signed by the security core for each pair of hash values and device identifiers. (For example, a hash of H1 and id1 may be computed separately from the hash of H2 and id2, which is computed separately from the hash of H3 and id3.) In this case, the receiver performs an analogous hashing process over the decrypted data block, and thereby determines individually whether each data stream is authentic. Note that it is possible in this approach for some of the values to match and the corresponding data streams to thereby be proven authentic, while other data streams in the collection are not authentic. The receiver may decide whether it wishes to trust the unauthentic streams, or only those proven to be authentic.

Instead of using timestamps and computing hash values periodically during recording of a collection of data streams, in an alternative embodiment the hash values may be computed over each entire data stream. This alternative approach may be useful, for example, in "all or nothing" situations where it is necessary to determine whether the entire collection of data is authentic and unaltered.

When timestamps are used within the notarization stream S4, the receiver can extract individual segments of a collection of data streams (such as a video frame, an audio clip, or a still photograph) from the collection and prove its authenticity, without having to use the entire recorded collection. Timestamping also allows determining whether the information recorded in the collection of data streams over a particular time interval is authentic: it may happen that segments of the collection over some time intervals can be proven authentic, while other intervals cannot. This ability to authenticate at least some segments of the collection may prove advantageous, as contrasted to computing hash values only over the entire length of a recording where the authenticity of the entire recording cannot subsequently be shown.

Other types of digital notarization techniques which are known in the art, such as digital watermarking, may be used instead of MPEG without deviating from the scope of the present invention. It will be obvious to one of skill in the art how the notarization process of FIG. 3 can be adapted to such other techniques.

As stated earlier, smart cards of the prior art do not have displays or buttons with which user authentication can be performed through means such as having a person enter a PIN and then comparing the entered value to information stored in the smart card. Therefore, separate devices are used for obtaining this information in the prior art, and the information is then transmitted to the smart card for on-card verification. If the user's identifying information is successfully verified, then the cryptographic keys stored on the smart card may be used to digitally sign information, thus legally binding the user. The presence of additional devices and links introduces several types of security exposures, as has been described. The presence of application code on the devices involved introduces the possibility that the presence of a smart card can be detected, thereby initiating a tracking of keystrokes to steal the PIN, or recording transactions for subsequent playback attacks, or enabling unauthorized subsequent access to the smart card, and so forth. Embodiments of the present invention solve these security problems. Furthermore, identifying information such as prior art PINs can be guessed or learned in other ways, compromising the security of the smart card's stored secrets. Embodiments of the present invention avoid this exposure by using biometric information, which cannot be faked by an impostor.

Figure 4:
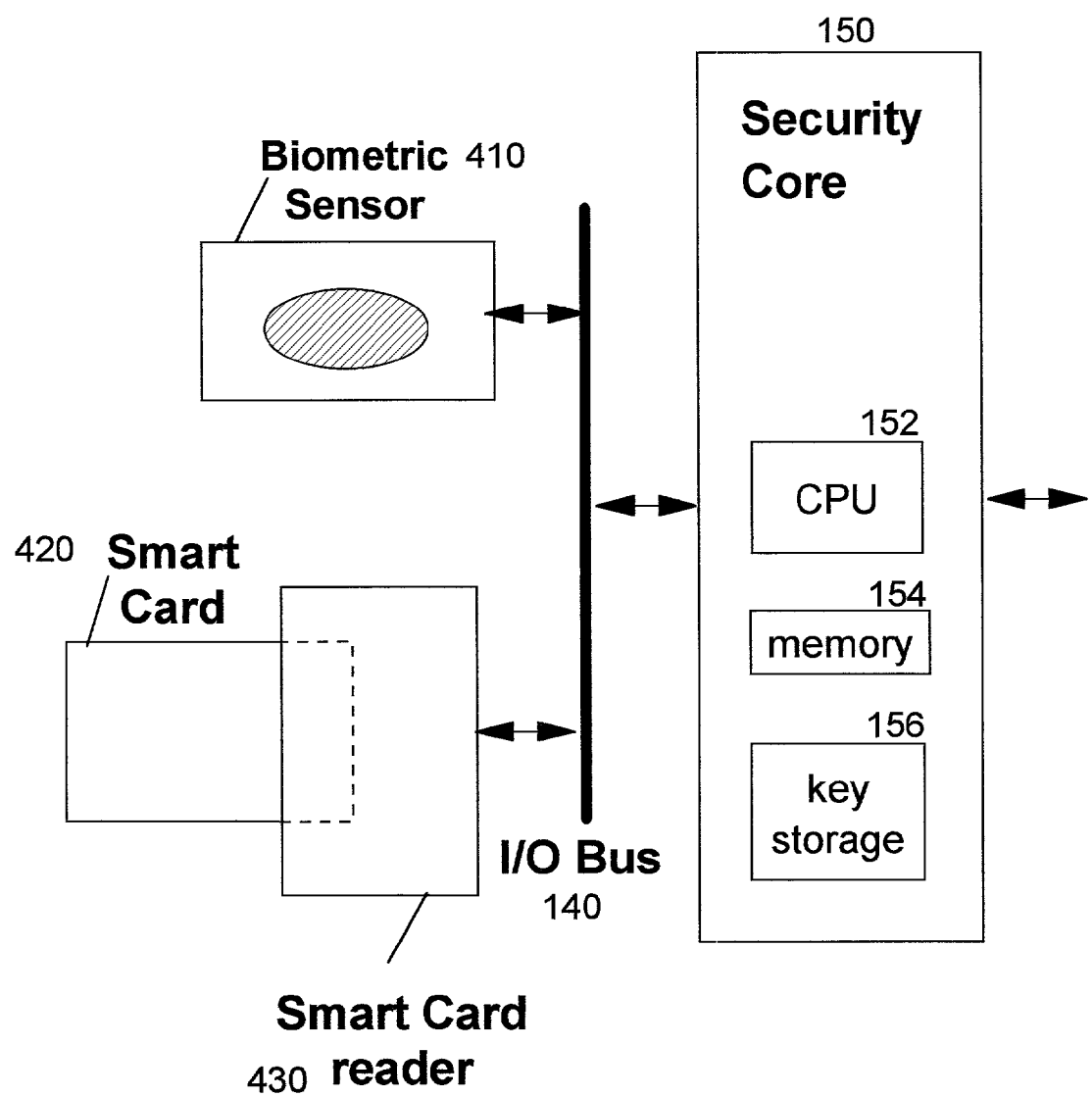
FIG. 4 depicts an aspect of the present invention which improves security when using smart cards.

In a first approach to improving security when using smart cards, which is illustrated in FIG. 4, the security core architecture provided by the present invention is used to provide for secure attachment of a smart card reader 430 and of a biometric sensor 410, each of which authenticates itself to the security core 150. A smart card 420 of the type available in the prior art, containing a user's cryptographic keys and information used to verify the user's identity during authentication, is inserted into the smart card reader. When using this approach, the user identifies himself using the biometric sensor. A validation process is then performed to compare the biometric input to the information stored on the smart card. This validation may be performed either by the biometric sensor itself, when this device is adapted to validating the information it senses, by securely transferring (or accessing) the information from the smart card across the integrated device bus 140 to the biometric sensor under control of the security core 150. Or, the validation may be performed by the security core 150 after securely transferring or accessing the information from the user's smart card. A benefit of this approach wherein a separate smart card reader is used is that multiple smart card/sensor combinations may be used with the same integrated device. (For example, a user may have multiple smart cards. If he chooses to use a retina scanner for authentication, this same device—which is likely to be rather expensive—may be used for authenticating multiple smart cards and may also be dynamically swapped from one integrated personal device to another.)

Figure 5:
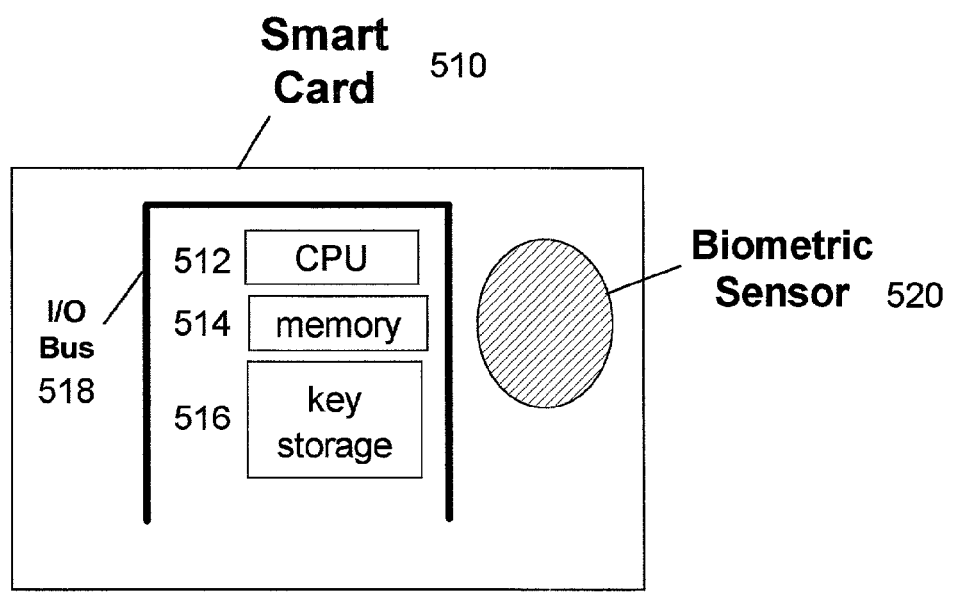
FIG. 5 illustrates an aspect of the present invention whereby a smart card has an integrated biometric sensor.
Figure 6:
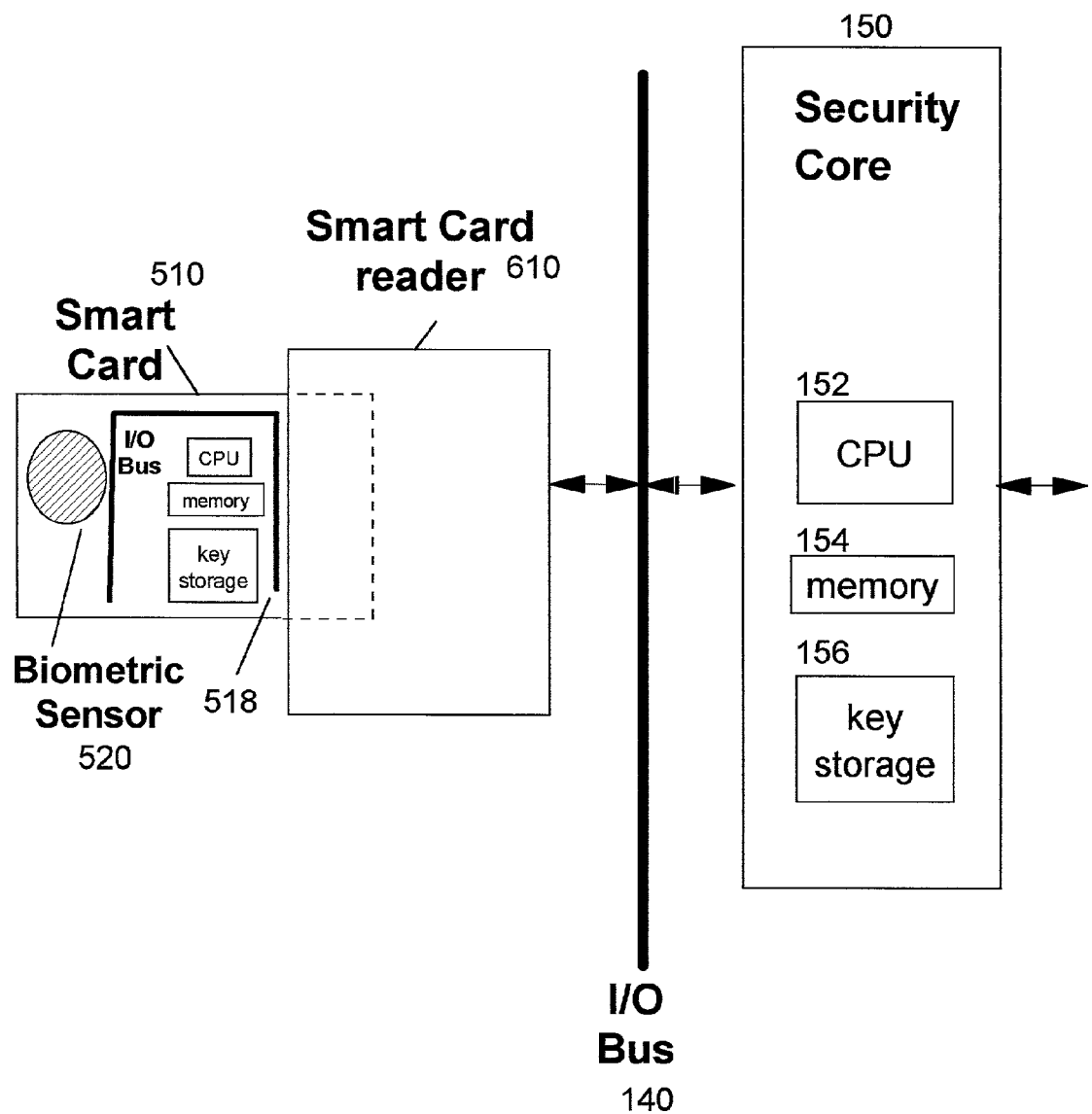
FIG. 6 depicts an aspect of the present invention whereby security is improved when using a smart card having an integrated biometric sensor.

In a second approach to improving security with smart cards, which is illustrated in FIGS. 5 and 6, the smart card and biometric sensor may be physically combined onto a single card. FIG. 5 shows this smart card 510 of the present invention, with its biometric sensor 520. This approach may be useful, for example, with a fingerprint scanner, where a fingerprint scanning apparatus can be embedded in the card surface. A number of other types of biometric scanners may alternatively be embedded in the card surface (including, but not limited to, palm print, voice print, retinal, and skin chemistry sensors). In this approach, the modified smart card is preferably responsible for performing the validation of the biometric information: a user provides his biometric input through biometric sensor 520, and the smart card then obtains this information by accessing the biometric sensor 520 across the smart card's I/O bus 518. The smart card with its protected information is effectively the security core in this case (see elements 512, 514, 516 and 518 of FIG. 5), with the smart card reader 610 being plugged into the bus 140 of another security core 150 as shown in FIG. 6. The I/O bus 518 enables securely transferring information among biometric sensor 520, on-board CPU 512, memory 514, and key storage 516. In the preferred embodiments, I/O bus 518 is the only means with which the input data from the biometric sensor 520 can be accessed (following the same architecture as shown in FIG. 1, where I/O bus 140 is the only means for accessing devices in I/O system 110). This approach of integrating the biometric sensor with the smart card avoids the need to transmit user authentication credentials such as a PIN over an insecure link from an input device.

Note that the I/O bus 518 of smart card 510 attaches to the security core's I/O bus 140 through the smart card reader 610 in the aspect illustrated in FIG. 6. In this aspect, biometric sensor 520 is attached to the I/O bus 518 of the smart card 510.

The integrated smart cards of preferred embodiments of the present invention, as illustrated in FIG. 5, may also be used with techniques beyond those of the integrated multi-function device of the present invention to provide for securely obtaining a user's identifying information. (However, security exposures of the type previously described with reference to the grapefruit and diamond ring scenario are still possible if the display mechanism used when presenting information to the user for her acceptance uses prior art techniques which do not provide the safeguards of the present invention whereby the entire I/O system may be secured. The aspect illustrated in FIG. 4 provides a secure I/O system, and thereby avoids this type of security exposure as well as providing for secure user identification.)

Preferably, when a pluggable device has its own security core, as is illustrated for smart card 510 of FIG. 6, and this pluggable device plugs into security core 150, the two security cores authenticate with each other and then functionally join to operate as one security core by relying on the combined functions of both.

The connection between the human user and the security core may be modelled in the same fashion as the connection between the I/O components and the security core, and between the application processors and the security core. Current methods for authenticating a user perform a one-time initial authentication. They assume that once the user has established his identity to the device, he retains control of the device and it is not possible for a non-authorized person to replace the authenticated user. But that is a poor assumption. It is possible for a thief to interrupt an automated teller machine (ATM) transaction after the user has inserted his ATM card and keyed in his PIN, and steal money from the bank account. Similarly, it is possible for a criminal to knock out a person who has logged on to a computer and perform functions that only the unconscious person was authorized to do.

An optional aspect of the present invention solves these problems using continuous biometric authentication. In this aspect, the multi-function device is equipped with a biometric sensor (such as a thumbprint scanner, a retinal scanner, a skin-chemistry sensor, a body weight detector, a biochemical sensor, a DNA sensor, etc. including as-yet-uninvented types of sensors) that is capable of repeatedly checking the user's identity during the entire period the device is in use. (Furthermore, the biometric sensor may also be of the type provided by embodiments of the present invention, as described above, wherein a smart card is equipped with an integrated biometric sensor.) The security core then monitors the biometric sensor and (in preferred embodiments) cancels the transaction (or other currently-executing application function) in the event of any interruption in the user's biometric authentication. This aspect is illustrated in more detail in FIG. 7.

Figure 7:
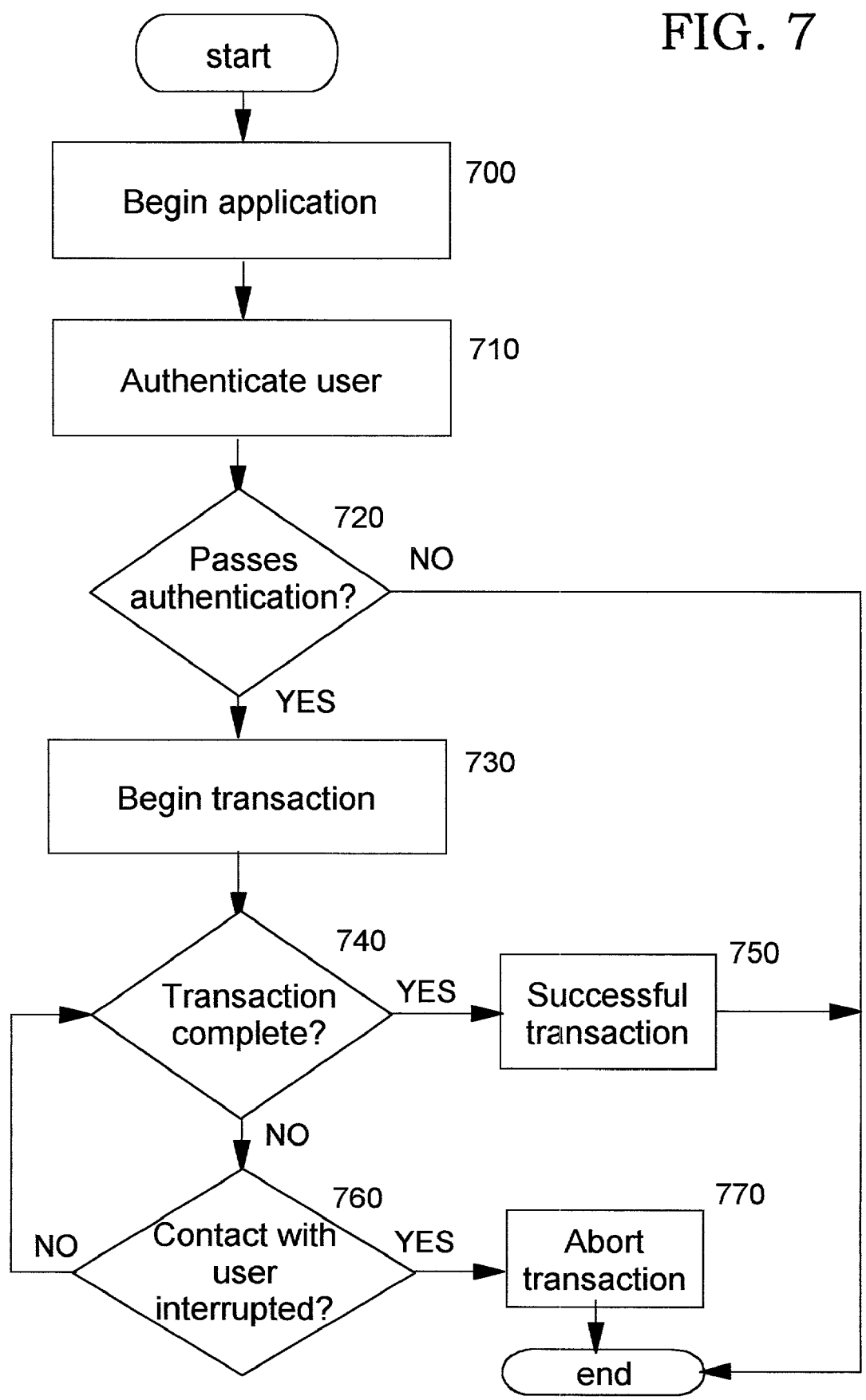
FIG. 7 provides a flowchart depicting logic with which preferred embodiments may provide continuous authentication of a user during a security-sensitive transaction.

The logic shown in FIG. 7 assumes that the logic of FIG. 2 has already completed—i.e. that the components which are plugged in to the security core have already been authenticated. The process of FIG. 7 is preferably used for an application that performs some type of security-sensitive operations, where the scope of such an operation is referred to herein a "transaction". As indicated at Blocks 700 and 710, the application begins operation and the application user is authenticated. (Applications may perhaps be designed such that the user is expected to be already authenticated, in which case the ordering of these blocks may be reversed.) Preferably, some type of biometric sensor is used for the user authentication in this aspect. By providing biometric sensors and monitoring those sensors, it is possible to continuously monitor the identity of a user while a device is in use. Block 720 checks to see if the user was successfully authenticated. If not, then the processing of FIG. 7 preferably ends. Otherwise, processing continues to Block 730 where the application begins performing a security-sensitive transaction of some type.

Blocks 740 and 760 represent repeatedly checking to determine whether this same user retains control of the device throughout the transaction. This repeated checking may be done in a number of different ways. For example, the checking process of Block 760 may be performed each time a predetermined interval of time elapses (where a timer-driven means preferably initiates operation of the checking process). Or, an application may be written to repeat the checking process based on application-specific considerations, such as upon switching from one piece of code to another or perhaps upon reaching functionally-significant milestones in the code. The checking may alternatively be initiated when switching device functions, or upon an automatic activation when the biometric sensor detects that it is no longer receiving signals. Or, multiple triggers for the checking process may be used in combination. When using predetermined intervals of time, a mechanism may be provided to enable the integrated device user to selectively determine the length of the time interval.

The manner in which Block 760 detects whether contact with the user has been interrupted will depend on the particular type of biometric sensor in use. For example, a pair of thumbprint sensors may be provided on opposing sides of a physical device, such that the device may be held in either the right or left hand and one of the sensors is therefore naturally activated while the device is being held. Or, a retina scanner may be provided on the device, where this scanner detects the user's continuous presence while the user is looking at the device. If the sensor detects an interruption, then control transfers to Block 770 where the transaction is preferably aborted. (Alternatively, it may be appropriate in other cases to simply mark the data that is being created by the application as "not authenticated".) The integrated device may also be deactivated, if desired for a particular environment, based on the assumption that the device is now in the possession of the wrong person. ("Interruption", for purposes of this aspect, may comprise detecting one or more of: a loss of biometric input, for example when the person is no longer in contact with the integrated device; a temporary interruption, such as may occur if the person releases his finger from a fingerprint sensor; or perhaps a change in the biometric input, which may occur, for example, if some other person gains control of the integrated device and the biometric input of this different person is then received.)

If the transaction completes without detecting an interruption of contact with the authenticated user, then control will reach Block 750 where the transaction can be considered as successfully created. Depending on the application, the logic of FIG. 7 may then exit, or control may return to Block 730 (not shown) to begin another transaction. (Although not shown in FIG. 7, it may also be desirable to include logic to check whether all of the authenticated components that were in use when performing the security-sensitive transaction—or perhaps all authenticated components that were plugged in when the transaction started—are still plugged in to their respective bus, prior to determining that the transaction is successfully created in Block 750.)

The ability to continually determine the identification of a user in this manner, especially for a pervasive device that may be easily stolen, and to proceed with a security-sensitive transaction only if the same user retains control of the device, will provide much better security to device users than is available in the prior art.

Note that while the discussions herein are in terms of a single device owner and authenticating previously-stored information pertaining to this user, alternative embodiments may provide for an integrated device that is shareable by multiple authorized owners (such as members of a family, or members of a workgroup). In such cases, identifying information for each authorized user may be pre-stored and compared to input of a current user of the device to determine whether this is one of the persons who is authorized, in an analogous manner to that which has been described. Furthermore, a particular user may have multiple forms of pre-stored identifying information, such as her thumbprint, her voice print, and her retinal scan. It will be obvious to one of skill in the art how the techniques described herein may be modified to account for these alternative embodiments.

By combining tamper-proof construction with authentication of manufactured device identity using PKI techniques, an integrated pervasive device can regain much of what has been lost through technology advances when it comes to providing legally significant recording of events. For example, it may be desirable to use a photograph of an accident scene for criminal and/or insurance purposes. As is well known, photographs can be altered quite easily using image processing software that is readily available today. There is therefore a need for reliably determining whether a photograph (and other media types as well) is authentic. Using the techniques of the present invention, a tamper-proof photo snapped at the scene of an accident and transmitted to the police instantaneously via a cell phone link could be notarized (digitally signed) by the security core, proving such things as the image's integrity, time/date, location (from GPS or phone triangulation), direction (using, for example, an integrated magnetic compass sensor), exposure settings (from digital camera hardware) and identity of the originating device (e.g. the MAC address of the security core, plus cryptographic information confirming which application processors and I/O devices were physically installed at the time), and proving via continuous biometric input who operated the device at the time when the photograph was taken. This approach provides a provable chain of custody for digital evidence that could be used later—for example, in a court proceeding. (Alternatively, if a biometric sensor is not in use for continuous authentication, then a digital notarization performed using the techniques of the present invention may prove the identification of a user who was involved in the transaction—such as the photo-capturing transaction just described—and who authenticated himself to the security core at some point during that transaction. This approach may be beneficial in many situations, although it may be insufficient for legal chain of evidence purposes.)

A company named PhotoSecurity.Com has filed an image verification patent, according to an article in *Business Wire* dated Nov. 1, 2000 which is titled "Image Verification Patent Filed on Behalf of PhotoSecurity.Com". However, no details are provided in this article as to how the image watermarking process in that patent is performed, nor what information is used in the image watermarking process.

Figure 8:
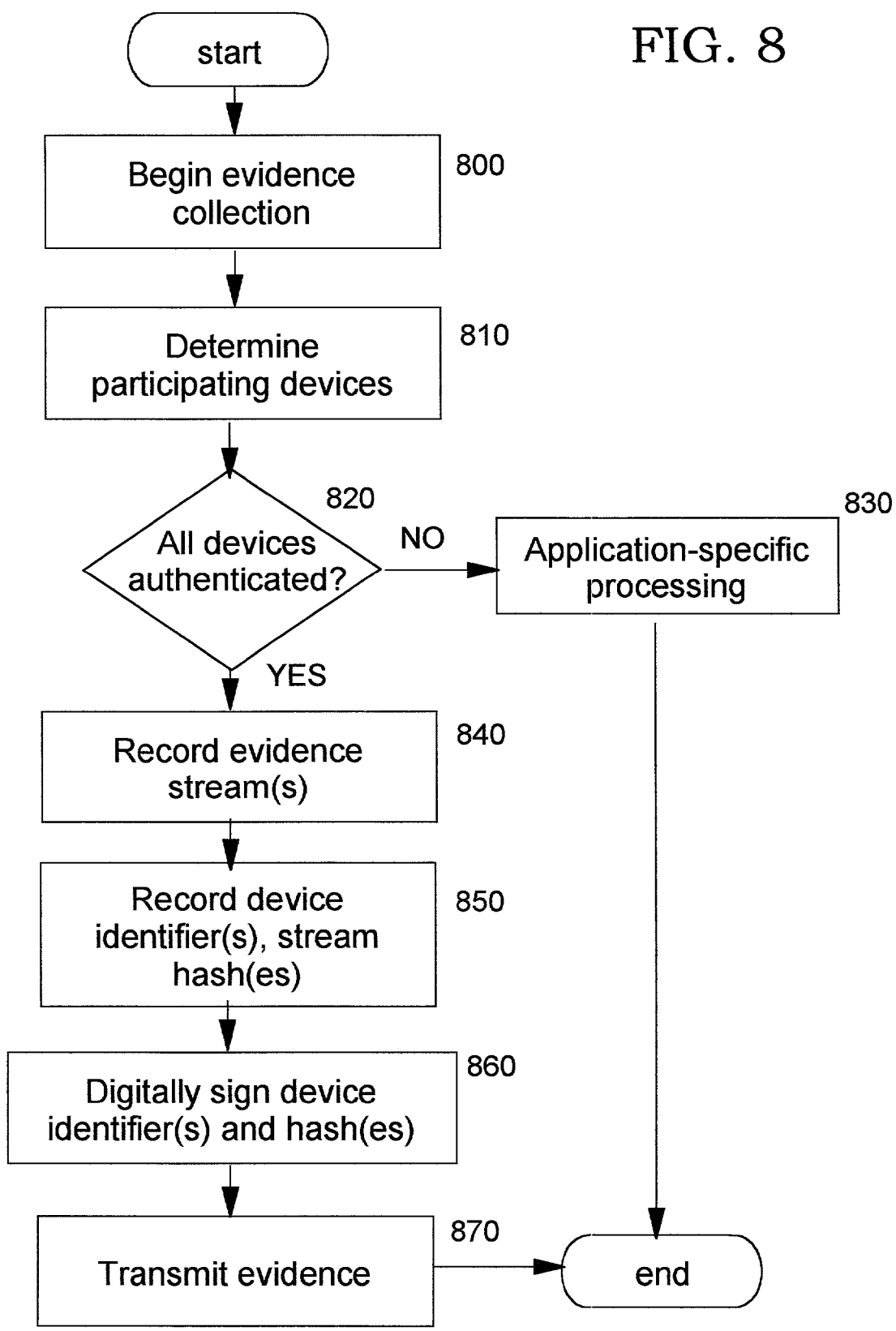
FIG. 8 provides a flowchart depicting logic with which a provable chain of evidence may be established for data represented in one or more data streams, according to preferred embodiments of the present invention.

The technique with which the present invention may be used to establish a legal chain of evidence is illustrated in FIG. 8. This logic assumes that the processing of FIG. 2 has already complete to authenticate the components that are plugged in to the security core. The user has also preferably been authenticated. The process of FIG. 8 is preferably used for an application that performs some type of evidence collection process, which may comprise recording data streams from a plurality of devices such as those described above with reference to the example of a photograph taken at an accident scene.

Blocks 800 and 810 represent beginning the evidence collection application, and determining which devices will be involved. An evidence collection application may be designed to use a particular group of devices, or perhaps the application may poll to determine which devices (and perhaps application processors as well) are currently plugged in to the bus(es) of the integrated device. Block 820 checks to see if each of these components was successfully authenticated (and may also check whether the user was authenticated). If this test has a negative result, then some application-specific handling is preferably performed (Block 830). This may comprise simply aborting the collection process, as shown in FIG. 8. Or, the collection process may continue, with the resulting data being marked as "not authenticated". Or, the collection process may continue but only collect data from those devices that have been authenticated. These latter two approaches involve slight alterations of the logic shown in FIG. 8, such that control returns to the mainline processing. The manner in which FIG. 8 may be altered to accommodate these alternative approaches will be obvious to one of ordinary skill in the art.

Data streams from the devices participating in the evidence collection operation are recorded (Block 840), using prior art techniques. In addition, the security core or perhaps an individual evidence collection application may be programmed to gather particular information for inclusion with these data streams (such as by polling an authenticated clock unit for the current time of day, polling an authenticated compass for directional information, etc., as discussed with reference to the accident scene example) if such information is necessary and is not already present in the recorded data streams. This additional information is preferably recorded as a separate data stream and added to the collection represented by Block 840.

The identifiers of the participating devices, which in the preferred embodiments were provided by the devices during operation of Block 220 of FIG. 2, are then recorded along with a hash that has been (or is now) computed over each data stream (Block 850). The combinations of device identifier and hash are then digitally signed, using the security core's private key (Block 860). Refer to the discussion of FIG. 3 for more details on how these hashes and identifiers are preferably operated upon. (Furthermore, the logic shown in FIG. 8 may be modified to use time intervals and compute hashes over these time intervals, rather than over an entire recorded stream, in the same manner that has been described for FIG. 3.) Once the collection of evidence has been notarized by adding the digitally signed information that is created in Block 850, it may be transmitted to a receiver (Block 870) or, alternatively, it may be stored for subsequent transmission or other inspection. (Note that the digital notarization may be stored with the evidence collection, or alternatively, it may be separately stored.)

The recorded evidence collection can then be proved authentic, identifying each device that was involved in its creation (as well as establishing the authenticity of the other information that may have been added to the evidence collection by the security core or application). This comprises decoding the digital signature using the public key of the security core, re-computing the hash, and comparing this re-computed hash to the hash from the decoded digital signature, in the same manner that has been described above with reference to FIG. 3 for verifying a notarized data stream.

If evidence that has been digitally notarized according to the present invention is subsequently transferred from one device to another, additional notarization "wrappers" may be included for each such device by including the authenticated device's identifier in a digital signature computed over the evidence collection, thereby mimicking the process with which the physical possession of tangible evidence is tracked for legal purposes today.

The described techniques may be adapted for many types of media and for many different purposes. For example, an audio transcript of a business agreement, similarly notarized using techniques of the present invention and preferably including signatures of the parties transcribed via a stylus on the pressure sensitive screen of the integrated device, might replace paper contracts in non-traditional business settings. The contract-signing procedure could also include photographic images of the parties, evidence of geographic location, time of day, identities of witnesses, etc. The existence of the notarization for the recorded audio transcript can serve to prove the authenticity and integrity of the contents of the recording. The additional information beyond the audio transcript, such as the photographic images and location information, can be notarized along with the audio recording using the techniques which have been described. These same techniques may be used with video recordings and other types of media recordings (including various combinations of multi-media) as well. Furthermore, the disclosed techniques may be used with many types of sensors (examples of which have been described above), and those sensors may provide information about their direction and/or other types of settings at the time their output data stream was created.

In a further extension of this technique, an audio recording received by a microphone, fed through a specific analog-to-digital codec can be digitally notarized and signed and provably tied to the collection of input devices and users involved in its creation, in the manner which has been described herein. (See, e.g., the discussion of FIGS. 2, 3, 7, and 8. Identification of the input devices is preferably provided using the information exchanged during the device authentication process of FIG. 2. Identification of the users preferably comes from biometric sensor input or other user authentication information.) Note that in a scenario such as this where one data stream is being transformed into another, it may not be necessary to preserve the original data stream. In such cases, the preferred embodiments do not compute a hash over such interim streams. Rather, a hash of the final data stream (for which authenticity is being established using the teachings of the present invention) is computed and the unique identifiers of any components involved in the transformation process that yields this final data stream are included in the block over which the security core creates its digital signature. See the discussion of FIG. 9, below, for a detailed example of using this technique.

Furthermore, an optional aspect of the present invention enables such an audio stream to be compressed in a novel manner, from an analog signal to ASCII text (which is arguably the most compact representation of speech). After conversion to digital form, the digital audio stream is fed into a specific release of voice-recognition software for interpretation utilizing a specific release of a vocabulary (possibly augmented by specific speaker-recognition training data, which may be used to enhance the voice recognition process). As long as all the devices involved in the data conversion are provably tied to the security core at the time of the data's creation, the resulting notarized signed ASCII text stream, even if not a perfect transcript of the audio portion, could provide a useful and very compressed manner to reliably store evidence of a conversation. Logic which may be used to implement this aspect is provided in FIG. 9.

As shown at Block 900, an analog data stream containing microphone input is captured, where this microphone has been authenticated using the techniques described with reference to FIG. 2. An identifier for the microphone, referred to in FIG. 9 as "ID1", is provided by the microphone to the security core during the authentication process. This analog data stream is then processed (Block 910) by an analog-to-digital converter, creating a digital data stream. It is assumed that the converter has also authenticated itself to the security core, and established its device identifier as "ID2" in this example. The newly-created digital data stream is then processed by a speaker-specific training database (Block 920) in combination with voice recognition software (Block 930) to increase the accuracy of determining the words that have been spoken using knowledge of one or more speaker's speech patterns. (Use of the speaker-specific database may be omitted in some cases.)

Figure 9:
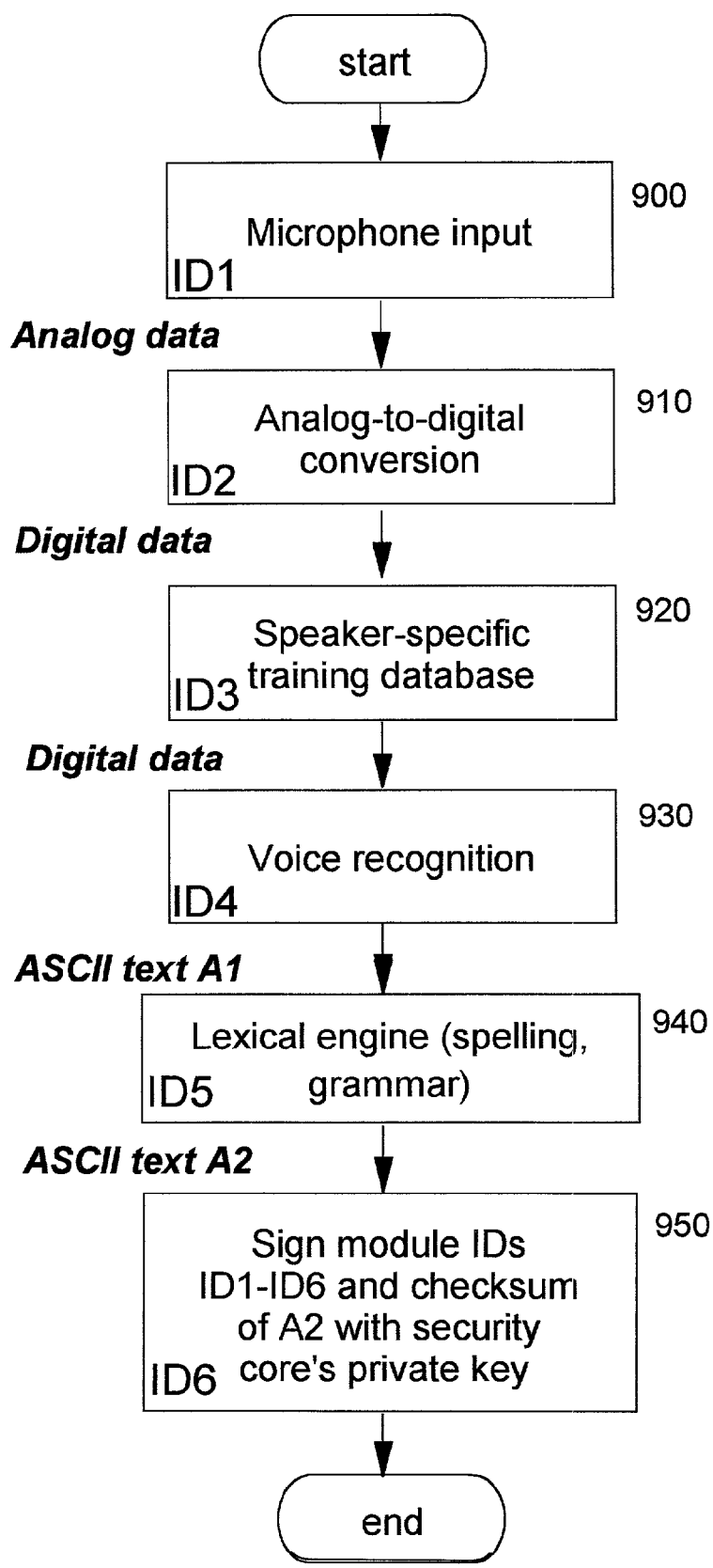
FIG. 9 provides a flowchart depicting logic with which an audio stream may be transformed into notarized text, according to preferred embodiments of the present invention.

The voice recognition software preferably generates an ASCII data stream, referred to in FIG. 9 as "Ab1". (While the preferred embodiment is described with reference to ASCII data streams, as will be obvious ASCII is merely one type of encoding that may be used. Other data stream encodings, such as EBCDIC or Unicode, may be used alternatively without deviating from the inventive concepts of the present invention.) Optionally, lexical operations may be performed on this ASCII data stream, such as searching for spelling and/or grammar errors and perhaps performing other types of context-sensitive semantic checks to increase the accuracy of the voice-to-text translation (Block 940). When this type of lexical processing is done, a new ASCII data stream "Ab2" results.

It is assumed that the speaker-specific database, voice recognition software, and lexical engine (when used) have all authenticated themselves to the security core, according to the present invention, and established their identifiers as "ID3", "ID4", and "ID5". Block 950 then creates a digital notarization for the text stream A2 by signing a hash of a data block containing the identifiers ID1 through ID6 (where "ID6" is the identifier of the authenticated application processor computing the digital signature information) and a hash or checksum of the contents of stream A2, using the security core's private key (in a similar manner to that previously described for creating a digital signature with reference to FIG. 3). This digital notarization may then be stored with the text stream, or alternatively, it may be separately stored. (Note that references herein to hashing data blocks before signing them using public key cryptography is the preferred approach for computing digital signatures for embodiments of the present invention. Alternatively, other methods of signing, such as encrypting the entire block or stream, may be used without deviating from the inventive concepts disclosed herein.)

If desired, a text compression operation (not shown in FIG. 9) may also be performed to further reduce the size of the ASCII stream (while retaining its essential content intact) prior to creating the digital notarization in Block 950. (For example, Lempel-Ziv compression may be performed, using techniques which are well known in the art.) In this case, the identifier of the authenticated application processor containing the compression code is also included in the data over which a signature is computed.

Furthermore, the voice characteristics of the speaker(s) may optionally be preserved as annotations in the stream as it is transformed. For example, if an application processor component (such as the voice recognition software) deduces the identity of a speaker, then the speaker's name may be included in the text stream prior to (or after, or associated with) the text passages attributed to that speaker. As another option, the annotations might also contain a mathematical summary of the voice characteristics of each speaker, such that these characteristics could be compared to known samples of speech at a later date to possibly identify the speaker(s).

While not explicitly shown in FIG. 8 or 9, the security core preferably monitors to ensure that all devices participating in the recordings (or, alternatively, all devices which are present when a recording begins, whether or not they are participating) remain attached throughout the process of recording and notarization. As was discussed earlier, detachment of a device may have different consequences depending on the type of device and the application with which it is being used, and thus a detected detachment may be handled in various ways (which have also been previously discussed).

As has been demonstrated, the present invention provides advantageous techniques for dynamically yet securely selecting the capabilities of a multi-function device and for improving the security of transactions performed with such devices. While this device has been described herein as a personal device and a pervasive computing device, this is for purposes of illustration and not of limitation: the disclosed techniques may be used to create secure integrated devices without regard to the physical size, complexity, cost, or eventual use thereof.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product for providing a secure, integrated device with dynamically selectable capabilities, the computer program product embodied on one or more computer-usable media and comprising:

computer-readable program code that is configured to operate a security core which provides security functions;

computer-readable program code that is configured to establish a secure, operable connection of one or more components to the security core, such that the security core can vouch for authenticity of each securely operably connected component, wherein the security core and the operably connected components thereby comprise the secure integrated device; and computer-readable program code that is configured to securely perform a transaction using the secure integrated device, wherein the computer-readable program code that is configured to securely perform a transaction further comprises computer-readable program code that is configured to digitally notarize, by the security core, an output data stream created by a selected one of the operably connected components of the secure integrated device, and wherein the computer-readable program code that is configured to digitally notarize further comprises:

computer-readable program code that is configured to authenticate the selected operably connected component to the security core;

computer-readable program code that is configured to compute, by the security core, a hash value over the output data stream;

computer-readable program code that is configured to hash, by the security core, a combination of (1) the hash value and (2) the unique identifier of the selected operably connected component, thereby creating a hashed data block;

computer-readable program code that is configured to digitally sign, by the security core, the hashed data block using a private key of the security core; and computer-readable program code that is configured to provide the digitally signed hashed data block along with the combination as the digital notarization of the output data stream.

2. The computer program product according to claim 1, wherein the computer-readable program code that is configured to authenticate further comprises computer-readable program code that is configured to use a unique identifier of the selected operably connected component, where the unique identifier is digitally signed by the selected operably connected component using a first private key associated with the selected operably connected component.

3. A computer program product for providing a secure, integrated device with dynamically selectable capabilities, the computer program product embodied on one or more computer-usable media and comprising:

computer-readable program code that is configured to operate a security core which provides security functions;

computer-readable program code that is configured to establish a secure, operable connection of one or more components to the security core, such that the security core can vouch for authenticity of each securely operably connected component, wherein the security core and the operably connected components thereby comprise the secure integrated device; and computer-readable program code that is configured to securely perform a transaction using the secure integrated device, wherein the computer-readable program code that is configured to securely perform a transaction further comprises computer-readable program code that is configured to digitally notarize, by the security core, an output data stream created by a selected one of the operably connected components of the secure integrated device, and wherein the computer-readable program code that is configured to digitally notarize further comprises:

computer-readable program code that is configured to authenticate the selected operably connected component to the security core;

computer-readable program code that is configured to compute, by the security core, a hash value over each of a plurality of segments of the output data stream, wherein a boundary between segments is determined by an elapsed time value;

computer-readable program code that is configured to hash, by the security core, a combination of (1) the hash value for each segment and (2) the unique identifier of the selected operably connected component, thereby creating a hashed data block for each segment;

computer-readable program code that is configured to digitally sign, by the security core, the hashed data block for each segment using a private key of the security core; and computer-readable program code that is configured to provide the digitally signed hashed data block for each segment along with the combination for each segment as the digital notarization of the segments which comprise the output data stream.

4. The computer program product according to claim 3, wherein the computer-readable program code that is configured to authenticate further comprises computer-readable program code that is configured to use a unique identifier of the selected operably connected component, where the unique identifier is digitally signed by the selected operably connected component using a first private key associated with the selected operably connected component.

5. The computer program product according to claim 3, wherein authenticity of selected ones of the digitally notarized segments of the output data stream may be separately verified using a public key of the security core.

6. The computer program product according to claim 1 or claim 3, further comprising:

computer-readable program code that is configured to authenticate a user of the secure integrated device; and computer-readable program code that is configured to include an identification of the authenticated user in the combination.

7. The computer program product according to claim 1 or claim 3, wherein the private key of the security core is securely stored in the secure integrated device.

8. The computer program product according to claim 1, further comprising computer-readable program code that is configured to verify authenticity of the output data stream by a receiver of the output data stream and the digitally signed hashed data block, using a public key of the security core, and to conclude that the output data stream is authentic if the verification succeeds.

9. The computer program product according to claim 8, wherein the computer-readable program code that is configured to verify authenticity further comprises computer-readable program code that is configured to obtain the public key from a digital certificate of the security core.

10. The computer program product according to claim 8, wherein the computer-readable program code that is configured to verify authenticity further comprises computer-readable program code that is configured to conclude that the output data stream has not been tampered with if the verification succeeds.

11. A system for providing a secure, integrated device with dynamically selectable capabilities, comprising:

a security core which provides security functions;

one or more components;

means for operating the security core;

means for establishing a secure, operable connection of the components to the security core; such that the security core can vouch for authenticity of each securely operably connected component, wherein the security core and the operably connected components thereby comprise the secure integrated device; and means for securely performing a transaction using the secure integrated device, wherein the means for securely performing a transaction further comprises means for digitally notarizing, by the security core, an output data stream created by a selected one of the operably connected components of the secure integrated device, and wherein the means for digitally notarizing further comprises:

means for authenticating the selected operably connected component to the security core;

means for computing, by the security core, a hash value over the output data stream;

means for hashing, by the security core, a combination of (1) the hash value and (2) the unique identifier of the selected operably connected component, thereby creating a hashed data block;

means for digitally signing, by the security core, the hashed data block using a private key of the security core; and means for providing the digitally signed hashed data block along with the combination as the digital notarization of the output data stream.

12. The system according to claim 11, wherein the means for authenticating further comprises means for using a unique identifier of the selected operably connected component, where the unique identifier is digitally signed by the selected operably connected component using a first private key associated with the selected operably connected component.

13. A system for providing a secure, integrated device with dynamically selectable capabilities, comprising:

a security core which provides security functions;

one or more components;

means for operating the security core;

means for establishing a secure, operable connection of the components to the security core, such that the security core can vouch for authenticity of each securely operably connected component, wherein the security core and the operably connected components thereby comprise the secure integrated device; and means for securely performing a transaction using the secure integrated device, wherein the means for securely performing a transaction further comprises means for digitally notarizing, by the security core, an output data stream created by a selected one of the operably connected components of the secure integrated device, and wherein the means for digitally notarizing further comprises:

means for authenticating the selected operably connected component to the security core;

means for computing, by the security core, a hash value over each of a plurality of segments of the output data stream, wherein a boundary between segments is determined by an elapsed time value;

means for hashing, by the security core, a combination of (1) the hash value for each segment and (2) the unique identifier of the selected operably connected component, thereby creating a hashed data block for each segment;

means for digitally signing, by the security core, the hashed data block for each segment using a private key of the security core; and means for providing the digitally signed hashed data block for each segment along with the combination for each segment as the digital notarization of the segments which comprise the output data stream.

14. The system according to claim 13, wherein the means for authenticating further comprises means for using a unique identifier of the selected operably connected component, where the unique identifier is digitally signed by the selected operably connected component using a first private key associated with the selected operably connected component.

15. The system according to claim 13, wherein authenticity of selected ones of the digitally notarized segments of the output data stream may be separately verified using a public key of the security core.

16. The system according to claim 11, further comprising:
means for authenticating a user of the secure integrated device; and
means for including an identification of the authenticated user in the combination.

17. The system according to claim 13, wherein the private key of the security core is securely stored in the secure integrated device.

18. The system according to claim 13, further comprising means for verifying authenticity of the segments of the output data stream by a receiver of the segments of the output data stream and the digitally signed hashed data blocks for the segments, using a public key of the security core, and for concluding that each segment of the output data stream is authentic if the verification succeeds.

19. The system according to claim 18, wherein the means for verifying authenticity further comprises obtaining the public key from a digital certificate of the security core.

20. The system according to claim 18, wherein the means for verifying authenticity further comprises concluding that the output data stream has not been tampered with if the verification succeeds.

21. A method of providing a secure, integrated device with dynamically selectable capabilities, comprising:
operating a security core which provides security functions;
establishing a secure, operable connection of one or more components to the security core, such that the security core can vouch for authenticity of each secure operably connected component, wherein the security core and the operably connected components thereby comprise the secure integrated device; and
securely performing a transaction using the secure integrated device, wherein securely performing a transaction further comprises digitally notarizing, by the security core, an output data stream created by a selected one of the operably connected components of the secure integrated device, wherein digitally notarizing further comprises:
authenticating the selected operably connected component to the security core;
computing, by the security core, a hash value over the output data stream;
hashing, by the security core, a combination of (1) the hash value and (2) the unique identifier of the selected operably connected component, thereby creating a hashed data block;
digitally signing, by the security core, the hashed data block using a private key of the security core; and
providing the digitally signed hashed data block along with the combination as the digital notarization of the output data stream.

22. The method according to claim 21, wherein authenticating further comprises using a unique identifier of the selected operably connected component, where the unique identifier is digitally signed by the selected operably connected component using a first private key associated with the selected operably connected component.

23. A method of providing a secure, integrated device with dynamically selectable capabilities, comprising:
operating a security core which provides security functions;
establishing a secure, operable connection of one or more components to the security core, such that the security core can vouch for authenticity of each secure operably connected component, wherein the security core and the operably connected components thereby comprise the secure integrated device; and
securely performing a transaction using the secure integrated device, wherein securely performing a transaction further comprises digitally notarizing, by the security core, an output data stream created by a selected one of the operably connected components of the secure integrated device, wherein the digitally notarizing further comprises:
authenticating the selected operably connected component to the security core;
computing, by the security core, a hash value over each of a plurality of segments of the output data stream, wherein a boundary between segments is determined by an elapsed time value;
hashing, by the security core, a combination of (1) the hash value for each segment and (2) the unique identifier of the selected operably connected component, thereby creating a hashed data block for each segment;
digitally signing, by the security core, the hashed data block for each segment using a private key of the security core; and
providing the digitally signed hashed data block for each segment along with the combination for each segment as the digital notarization of the segments which comprise the output data stream.

24. The method according to claim 23, wherein the authenticating further comprises using a unique identifier of the selected operably connected component, where the unique identifier is digitally signed by the selected operably connected component using a first private key associated with the selected operably connected component.

25. The method according to claim 23, wherein authenticity of selected ones of the digitally notarized segments of the output data stream may be separately verified using a public key of the security core.

26. The method according to claim 23, further comprising:

authenticating a user of the secure integrated device; and including an identification of the authenticated user in the combination.

27. The method according to claim 21, wherein the private key of the security core is securely stored in the secure integrated device.

28. The method according to claim 23, further comprising verifying authenticity of the segments of the output data stream by a receiver of the segments of the output data stream and the digitally signed hashed data blocks for the segments, using a public key of the security core, and concluding that each segment of the output data stream is authentic if the verification succeeds.

29. The method according to claim 28, wherein verifying authenticity further comprises obtaining the public key from a digital certificate of the security core.

30. The method according to claim 28, wherein verifying authenticity further comprises concluding that the output data stream has not been tampered with if the verification succeeds.

* * * * *